US010906409B2

(12) United States Patent
Brenner et al.

(10) Patent No.: US 10,906,409 B2
(45) Date of Patent: Feb. 2, 2021

(54) BATTERY TERMINALS FOR A LITHIUM ION BATTERY MODULE

(71) Applicant: Clarios Advanced Solutions GmbH, Hannover (DE)

(72) Inventors: Helge Brenner, Hannover (DE); Markus Hoh, Wunstorf (DE); Ralf Joswig, Buchholz (DE); Martin Wiegmann, Borstel (DE)

(73) Assignee: Clarios Advanced Solutions GMBH, Hannover (DE)

( * ) Notice: Subject to any disclaimer, the term of this patent is extended or adjusted under 35 U.S.C. 154(b) by 131 days.

(21) Appl. No.: 16/081,845

(22) PCT Filed: Mar. 3, 2017

(86) PCT No.: PCT/EP2017/055028
§ 371 (c)(1),
(2) Date: Aug. 31, 2018

(87) PCT Pub. No.: WO2017/149128
PCT Pub. Date: Sep. 8, 2017

(65) Prior Publication Data
US 2019/0061554 A1   Feb. 28, 2019

(30) Foreign Application Priority Data
Mar. 3, 2016   (DE) .................. 10 2016 103 836

(51) Int. Cl.
*B60L 50/64*   (2019.01)
*H01M 2/06*   (2006.01)
(Continued)

(52) U.S. Cl.
CPC ............... *B60L 50/64* (2019.02); *H01M 2/06* (2013.01); *H01M 2/1077* (2013.01);
(Continued)

(58) Field of Classification Search
None
See application file for complete search history.

(56) References Cited

U.S. PATENT DOCUMENTS 4,859,547 A   8/1989   Adams et al.
7,879,487 B2   2/2011   Bechtold et al.
(Continued)

FOREIGN PATENT DOCUMENTS

CN   103022405   4/2013

OTHER PUBLICATIONS

International Search Report and Written Opinion for PCT/EP2017/055028 dated Apr. 10, 2017. 10 pages.

*Primary Examiner* — Carmen V Lyles-Irving
(74) *Attorney, Agent, or Firm* — Boardman & Clark LLP

(57) ABSTRACT

A lithium ion (Li-ion) battery module includes a module terminal configured to electrically couple the Li-ion battery module to an electrical connector of an external load. The module terminal includes a conductive component and a sealing shim secured to the conductive component, the sealing shim being formed from a polymeric material. The Li-ion battery module includes a housing containing a plurality of Li-ion battery cells and having an opening through which the conductive component of the module terminal at least partially protrudes. The sealing shim of the module terminal is directly secured to the housing and forms a seal isolating an interior of the housing from the external environment.

5 Claims, 5 Drawing Sheets

(51) Int. Cl.
*H01M 2/20* (2006.01)
*H01M 2/30* (2006.01)
*H01M 10/0525* (2010.01)
*H01M 2/10* (2006.01)

(52) U.S. Cl.
CPC ........... *H01M 2/206* (2013.01); *H01M 2/307* (2013.01); *H01M 10/0525* (2013.01); *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | | |
|---|---|---|---|
| 2003/0207172 A1 | 6/2003 | Misra et al. | |
| 2006/0127759 A1* | 6/2006 | Bechtold | B29C 66/1222 429/185 |
| 2015/0010805 A1* | 1/2015 | Han | H01M 2/263 429/149 |
| 2015/0037662 A1 | 5/2015 | Pinon et al. | |
| 2016/0091141 A1* | 3/2016 | Gehlhausen | H01M 2/1094 220/560.01 |
| 2017/0001584 A1* | 1/2017 | Harris | B60R 16/033 |

\* cited by examiner

BATTERY TERMINALS FOR A LITHIUM ION BATTERY MODULE

CROSS REFERENCE TO RELATED APPLICATIONS

This application is a National Stage Entry of PCT application PCT/EP2017/055028 filed Mar. 3, 2017, which claims priority to German Patent Application No. 102016103836.9 filed Mar. 3, 2016.

BACKGROUND

The present disclosure relates generally to the field of batteries and battery modules. More specifically, the present disclosure relates to lithium-ion (Li-ion) battery modules and associated battery terminals.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, a Li-ion battery module may include several battery cells contained in a module housing, and module terminals that provide an electrical connection between the cells and an external load. The module terminals generally protrude through a wall of the module housing in a manner that maintains a seal between an interior of the module housing and the external environment. Unfortunately, many processes for assembling such Li-ion battery modules involve the integration of several components using a number of assembly stages or steps, particularly with respect to the module terminals. For example, typical assembly processes may use bolts and other threaded connections for securing the terminals to the housing. Seals between the terminals and the housing may be formed by, for example, welding processes, which can be complex and time-consuming.

In view of these and other considerations, it is now recognized that a need exists for simplified module assembly processes. More specifically, it is now recognized that it may be desirable for simplified configurations that allow ready securement of the module terminals to the module housing, while also maintaining a liquid-tight and gas-tight seal between an external environment and the interior of the module. It is also now recognized that it may be desirable to reduce the number of components or parts involved in the assembly process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with an embodiment, a lithium ion (Li-ion) battery module includes a module terminal configured to electrically couple the Li-ion battery module to an electrical connector of an external load. The module terminal includes a conductive component and a sealing shim secured to the conductive component, the sealing shim being formed from a polymeric material. The Li-ion battery module includes a housing containing a plurality of Li-ion battery cells and having an opening through which the conductive component of the module terminal at least partially protrudes. The sealing shim of the module terminal is directly secured to the housing and forms a seal isolating an interior of the housing from the external environment.

In accordance with another embodiment, a module terminal is provided that is configured for use in a lithium ion (Li-ion) battery module. The module terminal includes a first conductive component configured to physically and electrically couple to a battery terminal connector of a vehicle to provide power to the vehicle, a second conductive component electrically coupled to the first conductive component and configured to electrically couple to a plurality of Li-ion battery cells of the Li-ion battery module, and a sealing shim formed from a polymer material and compressed between the first conductive component and the second conductive component. The sealing shim is configured to seal a terminal opening of a housing of the Li-ion battery module.

In accordance with a further embodiment, a method of producing a lithium ion battery module is provided that includes positioning a module terminal in a first portion of a housing of the Li-ion battery module, the first portion holding or being configured to hold a plurality of Li-ion battery cells, positioning a second portion of the housing over and in abutment with the first portion of the housing such that an inner surface of the second portion of the housing is in abutment with a sealing shim of the module terminal and such that at least a portion of the module terminal extends through an opening in the second portion of the housing, and directing a laser output through the second portion of the housing around a periphery of the opening and to the sealing shim such that the sealing shim becomes joined to the inner surface to form a seal.

DRAWINGS

Various aspects of this disclosure may be better understood upon reading the following detailed description and upon reference to the drawings in which.

Figure 3:
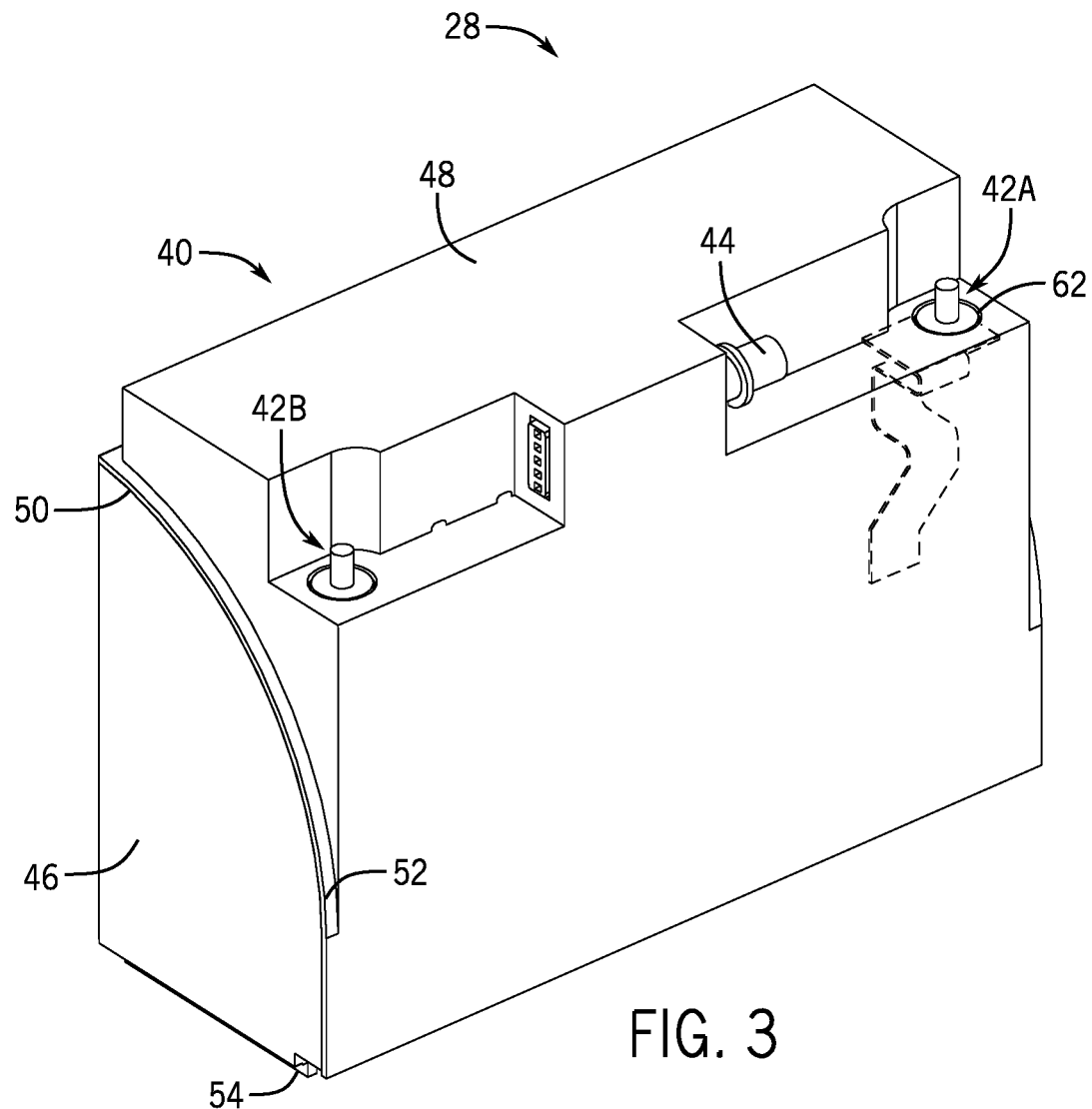
FIG. 3 is a perspective view of a battery module with a module housing and module terminals, in accordance with an aspect of the present disclosure.
Figure 6:
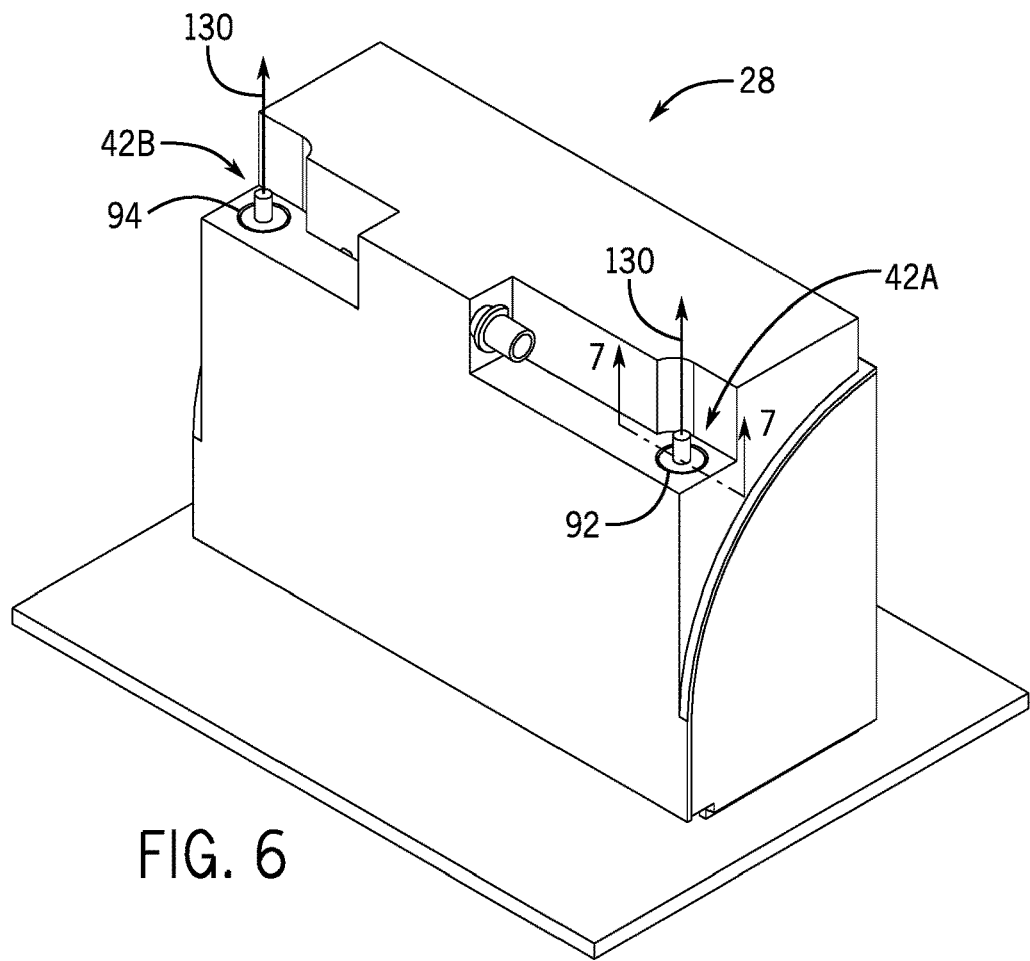
Figure 7:
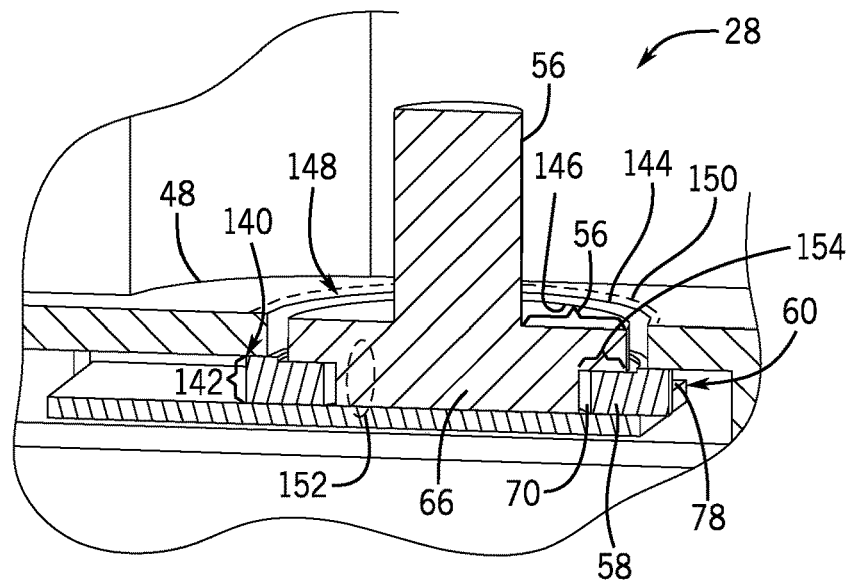

FIG. 6 is a perspective view of the battery module of FIG. 3 illustrating an embodiment of a process for assembling the module terminals in the module housing, in accordance with an aspect of the present disclosure; and FIG. 7 is a cross-sectional elevation view the battery module of FIG. 3, taken within section 7-7 of FIG. 6 and illustrating an example of the manner in which features of the module terminal are used to form a seal between an interior of the module housing and an environment external to the housing, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 V battery systems, a 12 V lithium ion battery may be used to supplement a 12 V lead-acid battery. More specifically, the 12 V lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 V lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 V, for example, up to 48, 96, or 130 V. Accordingly, in some embodiments, the output voltage of a 12 V lithium ion battery may be boosted using a DC-DC converter to supply power to the high voltage devices. Additionally or alternatively, a 48 V lithium ion battery may be used to supplement a 12 volt lead-acid battery. More specifically, the 48 V lithium ion battery may be used to more efficiently capture electrical energy generated during regenerative braking and subsequently supply electrical energy to power the high voltage devices.

As set forth above, assembling module terminals and integrating them into a Li-ion battery module may involve the manipulation of multiple components or parts as well as several steps that introduce complexity into the overall assembly process. In addition, threaded connections and/or permanent weld connections are often utilized to assemble module terminals and integrate them into Li-ion battery modules. Indeed, very tight and relatively inflexible connections are often employed between the module terminals and the module housing to isolate the interior of the Li-ion battery module from the external environment.

It is now recognized that replacing these types of connections with more flexible arrangements may provide several advantages. For example, threaded connections and permanent metallic weld connections are considered to be relatively inflexible, which can result in faster wear of their constituent parts when the Li-ion battery module experiences external forces (e.g., vibration due to driving). Indeed, threaded connections can become loose in situations where the thread wears down due to repeated friction events (e.g., from vehicle vibration), and permanent metal weld connections can be subject to breakage (e.g., fracture) in situations where the terminal is subjected to shear forces (e.g., if the terminal is struck). It is now recognized that replacing such features with more flexible arrangements, such as those described in further detail below, may provide greater wear resistance and associated longer times in operation, among other advantages. In addition, the module terminal configurations described herein may also simplify Li-ion battery module manufacturing processes.

In accordance with certain aspects of the present disclosure, it is now recognized that it may be desirable to simplify the assembly process of the module terminals. For example, in some embodiments, the module terminals may be assembled without using bolts, threads, or other similar fasteners. In one particular embodiment, the terminal is assembled to include two or more conductive components and a flexible component (e.g., a polymeric washer or gasket). The flexible component may enable the terminal to absorb certain forces (e.g., shock, shear) that might otherwise detrimentally affect the structural integrity of the terminal's connection to a housing of the module.

In one aspect of the present disclosure, the assembly of the module terminals is accomplished before the module housing is assembled. In other embodiments, the assembly of the module terminals may occur at the same time as assembly of the module. That is, assembly of the module terminals and sealing of the module housing may be accomplished during a single process, for example during a single step. In accordance with one embodiment, separate portions of a module housing may be brought into contact with one another, and the process of bringing the portions together may also place a flexible portion of the module terminals in contact with a surface of the housing to which the terminal is secured.

While the discussion set forth below focuses primarily on Li-ion battery modules, the present disclosure is intended to be applicable to other energy storage devices as well. Indeed, it is believed that the embodiments described herein may be useful for any energy storage device utilizing terminals for electrical connection and a housing for enclosing the device. Examples of such energy storage devices may include lead acid batteries, ultracapacitors, combinations of these, and so forth.

Figure 1:
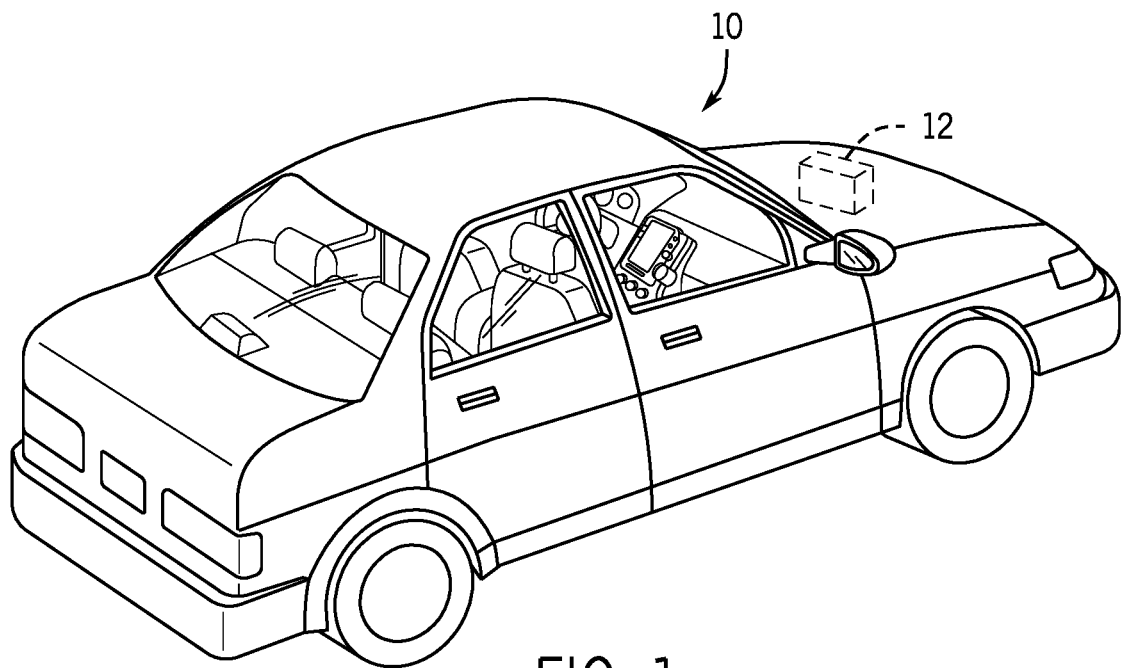
FIG. 1 is a perspective view of an xEV having a battery system configured in accordance with present embodiments to provide power for various components of the xEV, in accordance with an aspect of the present disclosure.

With the foregoing in mind, present embodiments relate to battery module terminal configurations applied to any battery or battery system, in particular battery systems employed in an xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
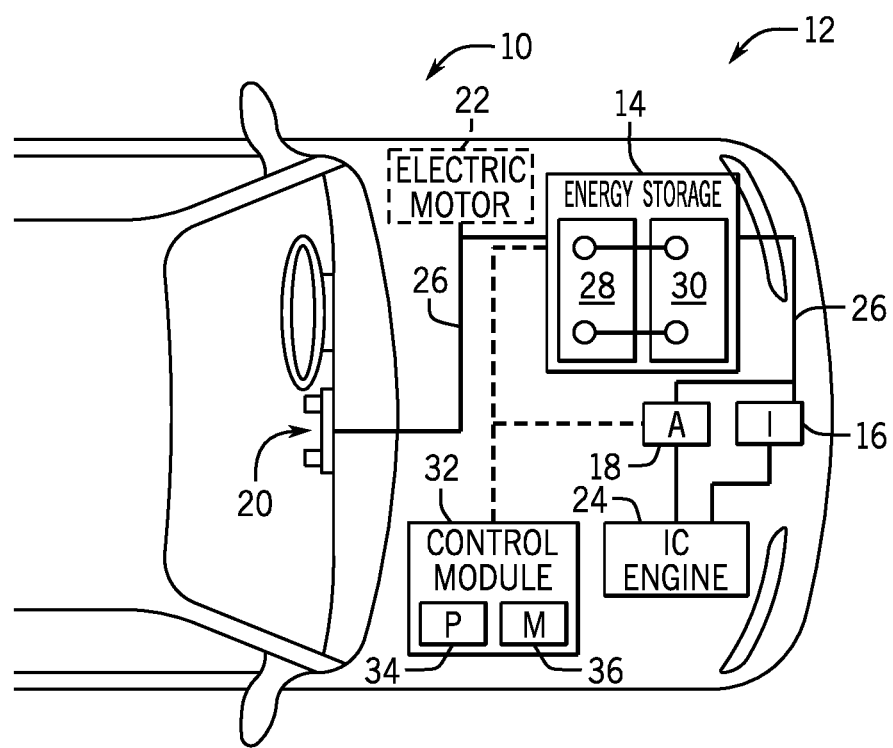
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12 volt battery system 12 is used, the bus 26 may carry electrical power typically between 8-18 V.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processors 34 and one or more memory units 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

To enable coupling of the lithium ion battery module 28 to various loads (e.g., the vehicles electrical system), the lithium ion battery module 28 may include the terminal configurations described herein. FIG. 3 illustrates one embodiment of the lithium ion battery module 28 having a module housing 40 and module terminals 42 configured in accordance with the present disclosure. Specifically, as shown, the module terminals 42 project through and out of the module housing 40 to enable electrical connection of the lithium ion battery module 28 to an external load. While the lithium ion battery module 28 includes a first module terminal 42a (e.g., a positive terminal) and a second module terminal 42b (e.g., a negative terminal), other embodiments of the lithium ion battery module 28 may include more than two such module terminals 42. Further, the first and second module terminals 42a, 42b may include one or more similar or swappable components. By way of non-limiting example, the lithium ion battery module 28 may be a 12 V module.

As depicted in its completed (assembled) configuration, the module housing 40 is closed such that it is liquid-tight and gas-tight. More specifically, the housing 40 is closed such that substantially no liquids or gases are able to pass between an interior of the housing 40 and an exterior of the housing 40 under normal operating conditions of the module 28, except via a predefined venting path including a module vent 44. Closure of the housing 40 is primarily effected by joining a first housing portion 46 (e.g., a main or lower housing portion) with a second housing portion 48 (e.g., a cover or upper portion) at a joint 50. The joint 50 may be closed (sealed) using any appropriate method. For example, in embodiments where either or both of the first and second housing portions 46, 48 include a plastic material, the joint 49 may be closed (e.g., to liquid and gas) using laser welding.

Laser welding may also be used in situations where either the first and second housing portions 46, 48 include a metal material. Additionally or alternatively, the joint 50 may be closed by ultrasonic welding, arc welding, and so forth. Such methods may be employed in embodiments where either or both of the first and second housing portions 46, 48 include a metal material.

The joint 50, as shown, is formed between a respective periphery 52 of the first housing portion 46 and a respective periphery 54 of the second housing portion 48. Thus, the particular manner in which the joint 50 is closed may depend on the material composition of the peripheries 52, 54 and appropriate sealing methods associated with such materials. In this regard, the joint 50 may be sealed using additional materials such as an adhesive (e.g., an epoxy resin), a solder, or other such materials applied to the peripheries 52, 54.

In accordance with an embodiment, the first housing portion 46 may be absorptive with respect to a welding laser output, and the second housing portion 48 may be transparent with respect to the welding laser output. Accordingly, the welding laser output may be directed through the second housing portion 48 and toward the first housing portion 46 (e.g., at the peripheries 52, 54). Upon absorption of the laser output, the respective periphery 52 of the first housing portion 46 may begin to heat and melt, thereby coupling with the second housing portion 48. Upon removal of the welding laser output and cooling, the first and second housing portions 46, 48 may be secured to one another in a substantially permanent manner.

The module housing 40 contains, within its interior, a plurality of lithium ion electrochemical cells (not shown), which may be implemented as individually housed battery cells. The battery cells are described in further detail below with respect to FIG. 5, and may include any appropriate electrolyte and electrode active material chemistry that enable electrical charging, discharging, and energy storage.

In general, the module terminals 42 of the present disclosure each enable electrical connection between the battery cells (as a single electrical assembly) within the module 28 and an external load. In accordance with certain embodiments, the module terminals 42 may have a multi-piece configuration, where the individual pieces may or may not be permanently fastened to one another before assembly of the module 28. As shown in the expanded view of FIG. 4a, the components of the module terminal 42 include a terminal post 56 (more generally, a portion of a first conductive component), a sealing shim 58, and a terminal bus bar 60 (or, more generally, a second conductive component). Generally, the terminal post 56 (or first conductive component) enables physical and electrical connection to an electrical connector of a load (e.g., a battery terminal connector of the vehicle 10 of FIGS. 1 and 2) to provide power to the load (e.g., the vehicle 10). The terminal bus bar 60 (or second conductive component) generally enables electrical connection to the battery cells in the module housing 40 (e.g., via physical connection to an internal bus bar). The terminal post 56 is in electrical contact with the terminal bus bar 60, and may be permanently secured to the terminal bus bar 60 as discussed in further detail below. In addition, the sealing shim 58 allows some degree of flexibility and movement between the module terminal 42 and the module housing 40, while also sealing an opening 62 in the second housing portion 48 through which the module terminal 42 protrudes.

Figure 4:
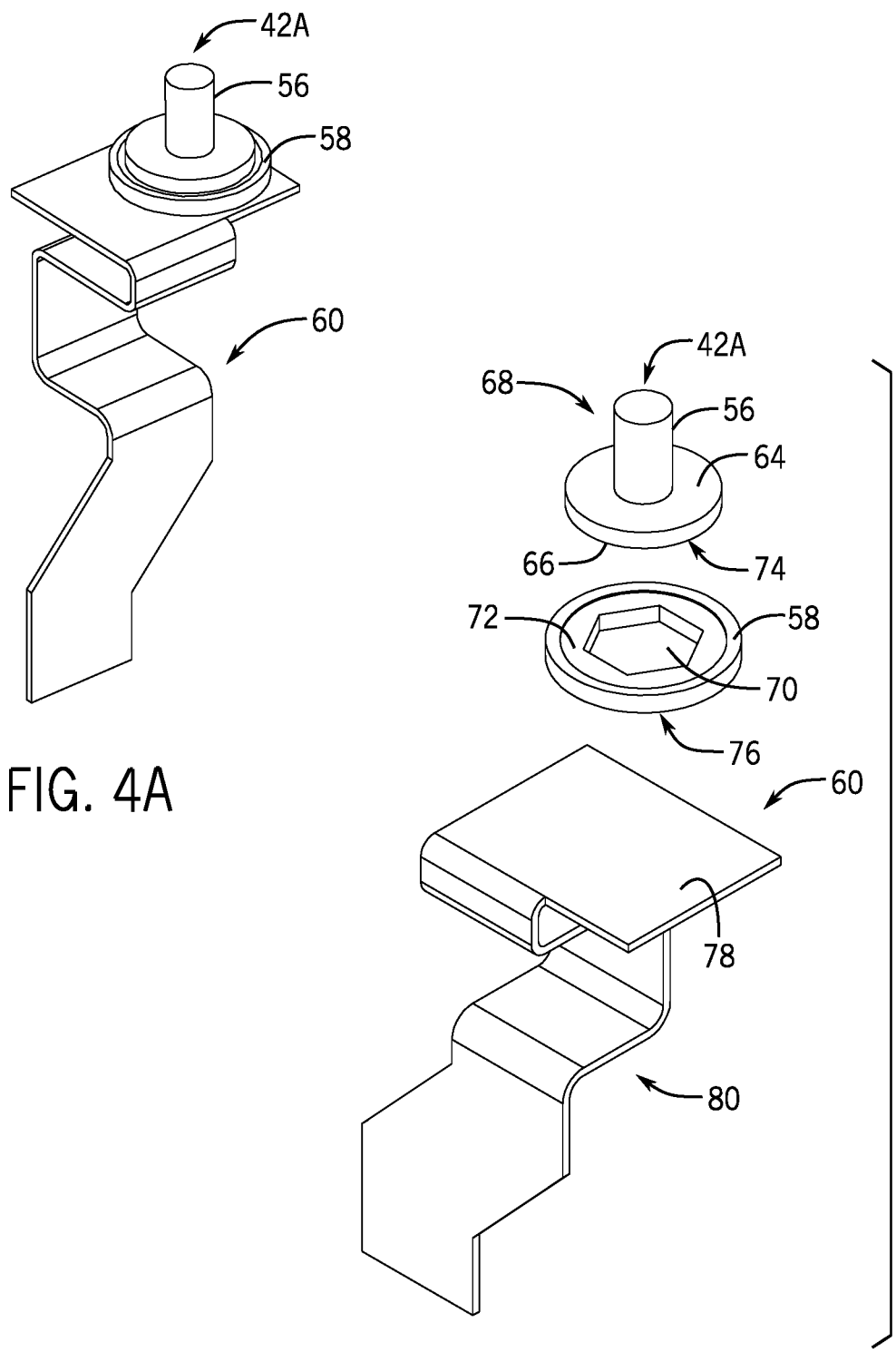
FIG. 4a is an expanded perspective view of a module terminal of the battery module of FIG. 3, in accordance with an aspect of the present disclosure.
FIG. 4b is an exploded perspective view of the module terminal shown in FIG. 4a, in accordance with an aspect of the present disclosure.

The configuration of the different module terminal components may be further appreciated with respect to FIG. 4b, which is an exploded view of the module terminal 42 shown in FIG. 4a. The terminal post 56 extends from a terminal base 64, which also includes a protruding portion 66 (more clearly seen in FIG. 7). Together, the terminal post 56, terminal base 64, and the protruding portion 66 may be considered to be a terminal post assembly 68, or the first conductive component of the module terminal 42. As described in further detail below, the protruding portion 66 extends in a direction that is generally parallel with respect to the terminal post 56, but in an opposite direction than the terminal post 56 from the terminal base 64. In certain embodiments, the two are co-axial. The terminal post 56, terminal base 64, and protruding portion 66 are generally formed of the same material, and may be integral with one another to facilitate manufacturing. In other embodiments, the terminal post 56, terminal base 64, and the protruding portion 66 may be formed from dissimilar metals but may be secured to one another using metals of sufficient galvanic compatibility.

To enhance compatibility between the terminal post assembly 68 and the terminal bus bar 60, the terminal post assembly 68 may be formed from the same material as the bus bar 60 (e.g., the same metal such as copper, stainless steel, or the like). In certain embodiments, the materials may be different but may be galvanically compatible. In certain embodiments, the terminal post assembly 68 and the terminal bus bar 60 (the first and second conductive components) are directly secured to one another by a weld (e.g., ultrasonic weld or laser weld). In still further embodiments, the terminal post assembly 68 and the terminal bus bar 60 may be integrally formed.

As set forth above, the sealing shim 58 may be configured to allow some degree of movement between the module terminal 42 and the module housing 40, while also sealing the module housing 40 from the external environment. Accordingly, the sealing shim 58 may be formed of a suitably compliant but also sufficiently impermeable (e.g., to certain gases and liquids) material, such as a polymeric (e.g., elastomeric) material. In certain embodiments, the sealing shim 58 may include one or more materials having optical absorbance characteristics that facilitate laser welding of the module terminal 42 to the module housing 40 via the sealing shim 58. This process is described in more detail below with respect to FIG. 7.

To help establish an electrical connection between the terminal assembly 68 and the bus bar 60, the sealing shim 58 includes an opening 70 sized to allow the protruding portion 66 to pass therethrough unencumbered. In certain embodiments, such as the embodiment depicted in FIG. 4b, the protruding portion 66 and the opening 70 have corresponding geometries. More specifically, the opening 70 and the protruding portion 66 may have complementary geometries such that certain movements of the terminal assembly 68 (e.g., rotation about its longitudinal axis) relative to the module housing 40 are restricted by the sealing shim 58. In certain embodiments, the terminal post assembly 68 is press-fitted (also known as interference fit or friction fit) on top of the sealing shim 58. As shown, the shim opening 70 has a hexagonal geometry, but other polygonal geometries, or some other irregular geometry may be used. Further still, the shim opening 70 may have a circular geometry.

Generally, the sealing shim 58 has a larger perimeter (e.g., circumference) than the perimeter (e.g., circumference) of the terminal base 64. In addition, to facilitate positioning of the terminal assembly 68 relative to the sealing shim 58, the sealing shim 58 may also include a shim seat 72 that is sized to receive the terminal base 64 in a nested arrangement. The shim seat 72 may be introduced into the sealing shim 58 during molding of the sealing shim 58, via embossing, coining, or any other suitable method. The method by which the shim seat 72 is introduced to the sealing shim 58 may depend on, for example, the type of material used to form the sealing shim 58.

In certain embodiments, the terminal post assembly 68 may be form-fit or press-fit into the sealing shim 58 such that the shim opening 70 is completely filled by the protruding portion 66, and such that a bottom surface 74 of the terminal base 64 is level with and completely fills the shim seat 72. When the module terminal 42 is assembled, a bottom surface 76 of the sealing shim 58 and the protruding portion 66 of the terminal post assembly 68 rest flat on a top surface 78 of the terminal bus bar 60. The terminal post 56 may be welded, for example using a laser output, to the top surface 78 of the terminal bus bar 60 such that an electrical connection is maintained between the terminal post assembly 68 and the terminal bus bar 60. The sealing shim 58 is therefore compressed between the terminal base 64 and the top surface 78. However, the sealing shim 58 is not necessarily directly secured to either the terminal base 64 or the top surface 78 by a permanent connection (e.g., a weld).

As described in more detail below, the terminal bus bar 60 includes a connection region 80 that is shaped to physically and electrically connect to various internal components of the module 40 (see FIG. 3). The first and second module terminals 42a, 42b may have the same or may have different configurations for their respective connection regions 80 to allow for connection to different types of components.

Figure 5:
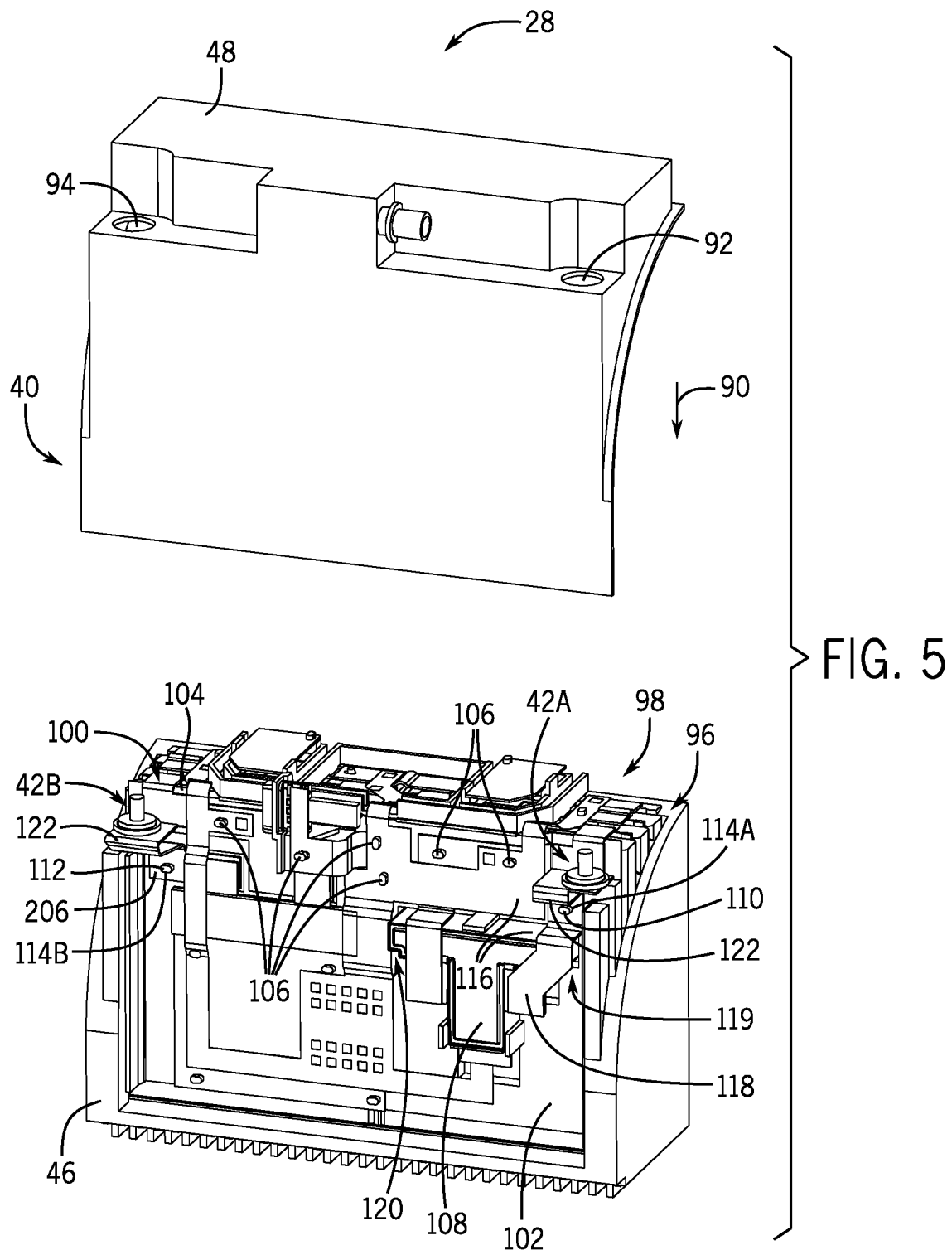
FIG. 5 is an exploded perspective view of the battery module of FIG. 3 illustrating the battery module having an upper module housing and a lower module housing, in accordance with an aspect of the present disclosure.

FIG. 5 depicts the manner in which the first module terminal 42a and the second module terminal 42b are arranged relative to other internal components of the lithium ion battery module 28. More specifically, FIG. 5 depicts the lithium ion battery module 28 of FIG. 3 with the second housing portion 48 exploded away from the first housing portion 46.

During module assembly, the second housing portion 48 is fitted onto the first housing portion 46 in the direction indicated by arrow 90, which also causes the respective terminal posts 56 of the first and second module terminals 42a, 42b to extend through terminal openings in the second housing portion 48 (shown as a first terminal opening 92 and a second terminal opening 94).

As shown, the first housing portion 46 is used to secure a plurality of battery cells 96, which are positioned in two adjacent lineups or stacks (shown as a first lineup 98 and a second lineup 100). Any number of lineups (e.g., one or more) may be used. In addition, the first housing portion 46 includes an electrical component carrier 102, which functions to hold the plurality of battery cells 96 in place within the first housing portion 46, and also functions to secure various electrically conductive components in place relative to the plurality of battery cells 96. For example, the electrical component carrier 102 may be a single component formed from plastic and/or some other nonconductive material, and may be used to hold the plurality of battery cells 96 in place while also allowing proper positioning of battery cell bus bars 104 used to interconnect individual battery cells together. The electrical component carrier 102 may also have a plurality of protrusions 106 that function to physically interface with and hold other electrically conductive components including sense lines (e.g., voltage and/or temperature sense lines), electronics (e.g., the control module 32), a relay 108, and the first and second module terminals 42a, 42b, among others.

In the illustrated embodiment, the electrical component carrier 102 includes a first protrusion 110 that interfaces with a respective connection region 80a of the first module terminal 42a and a second protrusion 112 that interfaces with a connection region 80b of the second module terminal 42b at respective terminal bus bar openings 114a, 114b. The illustrated respective connection regions 80a, 80b have different configurations (e.g., shapes, geometries), and are each specifically shaped to physically and electrically couple to different electrical components.

Referring to the first module terminal 42a, for example, its respective connection region 80a includes a stepped region 116 that is shaped to form fit around a portion of the relay 108. The stepped region 116 of the connection region 80a transitions to a planar region 118. The stepped region 116 also allows the first module terminal 42a to be compatible with the profile of the second housing portion 48. In combination, the stepped region 116 and the planar region 118 may be used as an additional securement feature for the relay 108. The planar region 118 is used to electrically couple the first module terminal 42a to a first side 119 of the relay 108. A second side 120 of the relay 108 may be electrically coupled to the plurality of battery cells 96 via one or more bus bars. During operation, the control module 32 (see FIG. 2) may control the relay 108 to electrically couple and de-couple the first and second sides 119, 120 to form (or break) an electrical pathway between the plurality of battery cells 96 and the first module terminal 42a.

The first module terminal 42a and the second module terminal 42b also each include a tolerance compensation region 122 in their respective terminal bus bars 60a, 60b. The tolerance compensation region 122 of each module terminal 42 is positioned between the flat region 78 and the connection region 80, and is configured to allow for manufacturing imperfections in module components. The tolerance compensation region 122 may also be configured to absorb certain forces that the module terminals 42 may experience throughout the life of the lithium ion battery module 28 (e.g., vibrations, compressive or straining loads).

Once the second housing portion 48 and the first housing portion 46 are brought together as shown in FIG. 6 (e.g., either before or after being permanently secured to one another), the module terminals 42 may be permanently secured to the second housing portion 48. As depicted in FIG. 6, the terminal posts 56 protrude out of the terminal openings 92, 94 and the terminal bases 64 are exposed. The relative positioning of the components of the module terminals 42 and the second housing portion 48 allow for permanent connections to be made using one or more welds. The welds may be made between the components themselves, or between the components and the second housing portion 48. In certain embodiments, the components of the module terminals 42 (specifically, the terminal post assembly 68 and the terminal bus bar 60) may be permanently connected to one another before being inserted into the first housing portion 46.

Forming the module terminals 42 before securing them to the second housing portion 48 allows compression of the sealing shims 58 between the terminal post assemblies 68 and the terminal bus bars 60. For example, the terminal posts 56 may be pulled in a pull direction 130, which results in compression or additional compression of the sealing shim 58. However, in other embodiments, the terminal post assemblies 68 and the terminal bus bars 60 may be coupled to one another at the time of sealing the module terminals 42 to the module housing 40.

To help illustrate, FIG. 7 is an expanded cross-sectional view of the first module terminal 42a, taken within section 7-7 of FIG. 6. As shown in FIG. 7, as the terminal post 56 is pulled in the pull direction 130, the sealing shim 58 abuts and is compressed against an inner surface 140 of the second housing portion 48 proximate the first opening 92. In this way, the sealing shim 58 occupies a space 142 between the inner surface 140 of the second housing portion 48 and the flat region 78 of the terminal bus bar 60, forming a seal. The sealing shim 58 also spans the entire distance between a periphery 144 of the first opening 92 and a periphery 146 of the terminal base 64, which is believed to provide an enhanced seal between the interior of the module housing 40 and the external environment. That is, there may not be a direct connection between the periphery 144 of the first opening 92 and the periphery 146 of the terminal base 64.

As noted above, the second housing portion 48 may be secured to the sealing shim 58 using a laser weld. More specifically, a laser having a suitable output may be directed through the transparent second housing portion 48 generally along a direction 148 (e.g., generally from the outside of the second housing portion 48 and inward toward the sealing shim 58), and about the periphery 144. The laser output may traverse the second housing portion 48, and begin heating and melting the sealing shim 58 where the two abut one another. This causes the sealing shim 58 to become permanently fused to the second housing portion 48, forming a seal. The laser output may be controlled such that a weld seam 150 (shown with a dashed line) surrounds the periphery 144 of the first opening 92. In certain embodiments, the laser output may be such that the sealing shim 58 also fuses to the flat region 78 of the terminal bus bar 60. However, in other embodiments, the sealing shim 58 may not have a permanent and direct connection to the terminal post assembly 68 and the terminal bus bar 60.

As also shown, the protruding portion 66 of the module terminal 42 extends through the opening 70 of the seal shim 58 to make electrical contact with the flat region 78 of the terminal bus bar 60. Again, the seal shim 58 allows some degree of movement of the module terminal 42 relative to the module housing 40, and a permanent, fixed connection is formed directly between the terminal post assembly 68 and the terminal bus bar 60. By way of non-limiting example, a through-weld 152 may extend between the protruding portion 66 of the terminal base 64 and the flat region 78 of the terminal bus bar 60 such that the sealing shim 58 is compressed between a shelf portion 154 of the terminal base 64 and the flat region 78. The through-weld 152 may be formed by application of a laser output to the region of the terminal base 56 corresponding to the protruding portion 66 such that the protruding portion 66 welds to the flat region 78 of the terminal bus bar 60. Alternatively, the through-weld 152 may be made from the underside of the flat region 78 (i.e., the laser output may be applied in a direction from the flat region 78 toward the protruding portion 66. The through-weld 152 may span the entire overlap of the protruding portion 66 and the flat region 78, or only a portion of the overlap.

The shelf portion 154, as shown, corresponds to the portion of the terminal base 64 surrounding the region of the terminal base 64 from which the protruding portion 66 extends. That is, the shelf portion 154 extends radially beyond the protruding portion 66. The shelf portion 154 and the opening 92 may be sized such that there is no direct connection between a periphery of the shelf portion (the periphery 146) and the periphery 144 of the opening 92 in the second housing portion 48, but the two may contact one another.

One or more of the disclosed embodiments, alone or on combination, may provide one or more technical effects including the production of a module terminal having a flexible connection to a module housing. The module terminal may also be integrated into a housing (e.g., a plastic housing) of a lithium ion battery module in a way that produces a flexible seal for the housing. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A lithium ion (Li-ion) battery module, comprising:
a module terminal configured to electrically couple the Li-ion battery module to an electrical connector of an external load, wherein the module terminal includes a conductive component and a sealing shim secured to the conductive component, the sealing shim being formed from a polymeric material, wherein the module terminal includes a first conductive component and a second conductive component secured to one another, and wherein the conductive component of the module terminal is a portion of the first conductive component;
a housing containing a plurality of Li-ion battery cells and having an opening through which the conductive component of the module terminal at least partially protrudes, wherein the first conductive component is a terminal post assembly and the second conductive component is a terminal bus bar configured to electrically couple to the plurality of Li-ion battery cells, and wherein the terminal post assembly includes a terminal base, a terminal post extending from the terminal base as the portion of the first conductive component, and a protruding portion extending from the terminal base in an opposite direction from the terminal post and in electrical contact with the terminal bus bar; and
wherein the sealing shim of the module terminal is directly secured to the housing by a laser weld surrounding the opening and forms a seal isolating an interior of the housing from the external environment, and wherein the terminal base includes a shelf portion extending radially beyond the protruding portion, and the sealing shim is compressed between the shelf portion and a flat region of the terminal bus bar; and
wherein a portion of the housing having the opening is transparent to a laser used to form the laser weld.

2. The Li-ion battery module of claim 1, wherein the sealing shim is not directly secured to the flat region of the terminal bus bar.

3. The Li-ion battery module of claim 1, wherein the sealing shim extends radially beyond the shelf portion of the terminal post assembly, and the sealing shim is positioned between the flat region of the terminal bus bar and an interior surface of the housing to form the seal such that there is no direct connection between a periphery of the shelf portion and a periphery of the opening in the housing.

4. The Li-ion battery module of claim 3, wherein the sealing shim is directly secured to the interior surface of the housing by a through weld.

5. The Li-ion battery module of claim 1, wherein the housing includes a first housing portion holding the plurality of Li-ion battery cells in a fixed position and a second housing portion secured to the first housing portion, and wherein the sealing shim is directly secured to an interior surface of the second housing portion.

* * * * *